(12) United States Patent
Minami

(10) Patent No.: US 8,140,036 B2
(45) Date of Patent: Mar. 20, 2012

(54) INFORMATION PROCESSING APPARATUS

(75) Inventor: Eiji Minami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 233 days.

(21) Appl. No.: 12/695,051

(22) Filed: Jan. 27, 2010

(65) Prior Publication Data

US 2010/0190445 A1    Jul. 29, 2010

(30) Foreign Application Priority Data

Jan. 28, 2009  (JP) .................................. 2009-017143

(51) Int. Cl.
*H04B 1/18* (2006.01)

(52) U.S. Cl. .................... 455/154.2; 455/145; 455/41.2; 235/462.25; 358/474

(58) Field of Classification Search ............... 455/154.2, 455/145, 41.2, 41.1, 3.06, 418; 235/462.25, 235/380, 385; 358/474, 476
See application file for complete search history.

(56) References Cited

U.S. PATENT DOCUMENTS

| | | | | |
|---|---|---|---|---|
| 4,149,798 A * | 4/1979 | McGowan et al. | ......... | 430/49.43 |
| 4,748,514 A * | 5/1988 | Bell | ............... | 358/486 |
| 5,043,827 A * | 8/1991 | Beikirch | ....................... | 382/300 |
| 5,119,213 A * | 6/1992 | Graves et al. | .................. | 358/488 |
| 5,929,425 A * | 7/1999 | Kanno | ....................... | 235/472.01 |
| 6,442,403 B1 * | 8/2002 | Becot et al. | ................. | 455/575.1 |
| 7,065,382 B2 * | 6/2006 | Alanara et al. | .............. | 455/556.1 |
| 7,419,100 B2 * | 9/2008 | Groeneboer et al. | .... | 235/472.01 |
| 7,456,985 B2 * | 11/2008 | Shiraishi | ....................... | 358/1.14 |
| 7,859,221 B2 * | 12/2010 | Baker et al. | ................... | 320/108 |
| 2002/0135815 A1 * | 9/2002 | Finn | ............................. | 358/473 |
| 2003/0119494 A1 * | 6/2003 | Alanara et al. | ................ | 455/421 |
| 2005/0279835 A1 * | 12/2005 | Groeneboer et al. | .... | 235/472.01 |
| 2006/0072142 A1 * | 4/2006 | Shiraishi | ....................... | 358/1.14 |
| 2008/0150478 A1 * | 6/2008 | Baker et al. | ................... | 320/108 |
| 2010/0117646 A1 * | 5/2010 | Hulbert et al. | ................ | 234/309 |
| 2010/0149038 A1 * | 6/2010 | Brown et al. | ................. | 342/360 |
| 2011/0175722 A1 * | 7/2011 | Jensen et al. | .............. | 340/539.1 |
| 2011/0176182 A1 * | 7/2011 | Otsuki | ........................ | 358/474 |

FOREIGN PATENT DOCUMENTS

| | | |
|---|---|---|
| JP | 2003-037694 A | 2/2003 |
| JP | 2006-060612 A | 3/2006 |
| JP | 2006-334811 A | 12/2006 |
| JP | 2007-081741 A | 3/2007 |
| JP | 2007-106037 A | 4/2007 |
| JP | 2008-059098 A | 3/2008 |

\* cited by examiner

*Primary Examiner* — Minh D Dao

(74) *Attorney, Agent, or Firm* — Kilpatrick Townsend & Stockton LLP

(57) ABSTRACT

Provided is an information processing apparatus having a plurality of antennas for short range wireless communication, cooperating with a detected terminal apparatus when each of the antennas detects the terminal apparatus as a counter communication party, and performing a process associated in advance with the antenna that detects the terminal apparatus, including a scanner, wherein if a first antenna among the antennas detects a first terminal apparatus, the image data read by the scanner is transmitted to the first terminal apparatus through the first antenna so as to be stored in the first terminal apparatus, wherein the scanner includes: a platen; a carriage in which a scanner head is provided, wherein a first antenna among the antennas is provided to the carriage, and wherein, every time when the second antenna is moved together with the carriage to sequentially detect the terminal apparatuses mounted on the platen, the information processing apparatus and the terminal apparatuses cooperate with each other to perform a process associated in advance with the second antenna.

5 Claims, 3 Drawing Sheets

INFORMATION PROCESSING APPARATUS

CROSS REFERENCE TO RELATED APPLICATIONS

The entire disclosure of Japanese Patent Application No. 2009-017143, filed Jan. 28, 2009 is expressly incorporated by reference herein.

BACKGROUND

1. Technical Field

The present invention relates to an information processing apparatus having a plurality of antennas for short range wireless communication, and more particularly, to a technology where an antenna detects a terminal apparatus as a counter communication party and a process is automatically performed.

2. Related Art

Recently, various products using short range wireless communication such as an automatic ticket stamping system including an IC-based commutation ticket and an automatic ticket stamping machine having a reader for the ticket have been commercialized.

JP-A-2008-59098 is an example of related art.

The short range wireless communication technology has also been expected to be widely used for a combination of a personal or office information processing apparatus and terminal apparatuses. In order to widely spread the technology, it is important to implement a simple, intuitive using method.

SUMMARY

An advantage of some aspects of the invention is to provide a simple, intuitive information processing apparatus using a short range wireless communication technology.

According to an aspect of the invention, there is provided an information processing apparatus having a plurality of antennas for short range wireless communication, cooperating with a detected terminal apparatus when each of the antennas detects the terminal apparatus as a counter communication party, and performing a process associated in advance with the antenna that detects the terminal apparatus.

In the above aspect, the information processing apparatus may further include a scanner. If a first antenna among the antennas detects a first terminal apparatus, the image data read by the scanner is transmitted to the first terminal apparatus through the first antenna so as to be stored in the first terminal apparatus.

In the above aspect, the scanner may include: a platen; and a carriage in which a scanner head is provided. In addition, a second antenna among the antennas may be provided to the carriage, and, every time when the second antenna is moved together with the carriage to sequentially detect the terminal apparatuses mounted on the platen, the information processing apparatus and the terminal apparatuses may cooperate with each other to perform a process associated in advance with the second antenna.

In the above aspect, the information processing apparatus may further include a printer. In addition, the information processing apparatus may acquire image data corresponding to an image displayed on an image display unit of each of the terminal apparatuses from each of the terminal apparatuses through the second antenna and perform printing based on the acquired image data by using the printer.

In the above aspect, the information processing apparatus may further include a printer. In addition, if a third antenna among the antennas detects a third terminal apparatus, the information processing apparatus may acquire image data corresponding to an image displayed on an image display unit of the third terminal apparatus through the third antenna and perform printing based on the acquired image data by using the printer.

In the above aspect, the information processing apparatus may further include a memory unit. In addition, if a fourth antenna among the antennas detects a fourth terminal apparatus, the information processing apparatus may acquire image data stored in the fourth terminal apparatus through the fourth antenna and store the image data in the memory unit.

In the above aspect, the antennas for the short range wireless communication may be a plurality of couplers for Transfer Jet.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an information processing apparatus according to an embodiment of the invention will be described with reference to the accompanying drawings.

Figure 1:
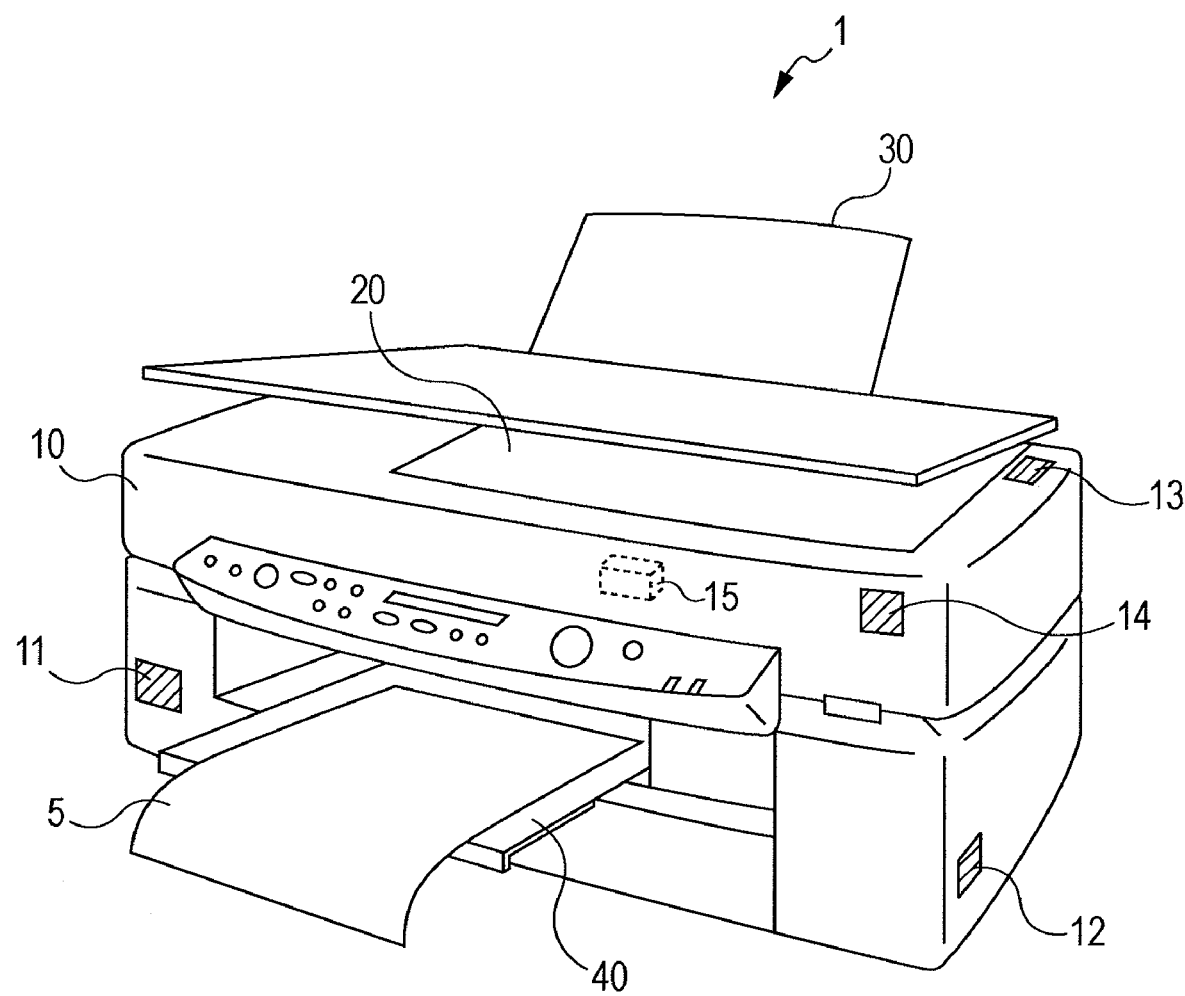
FIG. 1 is a view illustrating an outer appearance of a multifunctional apparatus that is an information processing apparatus, according to an embodiment of the invention, having a printer and a scanner.

FIG. 1 is a view illustrating an outer appearance of a multifunctional apparatus 1 that is an information processing apparatus, according to an embodiment of the invention, having a printer and a scanner.

As shown in the figure, the multifunctional apparatus 1 has a substantially rectangular parallelepiped case 10. A platen 20 is provided on an upper surface of the case 10. A reading head 43 (refer to FIG. 2) disposed to a carriage 41 received in the case 10 is configured to read an original document mounted on the platen 20. Therefore, the multifunctional apparatus 1 functions as a scanner. In addition, a feed tray 30 is provided on a rear surface of the case 10, and a discharge tray 40 is provided on a front surface thereof. In addition, the multifunctional apparatus 1 functions as a printer where a print engine 31 (refer to FIG. 2) received in the case 10 prints on a print sheet 5 fed from the feed tray 30 and discharges the sheet to the discharge tray 40.

In addition, the multifunctional apparatus 1 has a plurality of antennas 11, 12, 13, 14, and 15 for short range wireless communication. In the embodiment, as an example of the short range wireless communication, a case of using Transfer Jet is exemplified. In the description hereinafter, the antennas are called couplers 11, 12, 13, 14, and 15.

The coupler 11 is disposed to a front-side left lower portion of the case 10. The coupler 12 is disposed to a right-side lower front portion of the case 10. The coupler 13 is disposed to a top-side right rear portion of the case 10. The coupler 14 is disposed to a front-side right upper portion of the case 10. The coupler 15 is disposed to the carriage 41 of the scanner 4 (refer to FIG. 2).

Now, the multifunctional apparatus 1 is described in detail.

Figure 2:
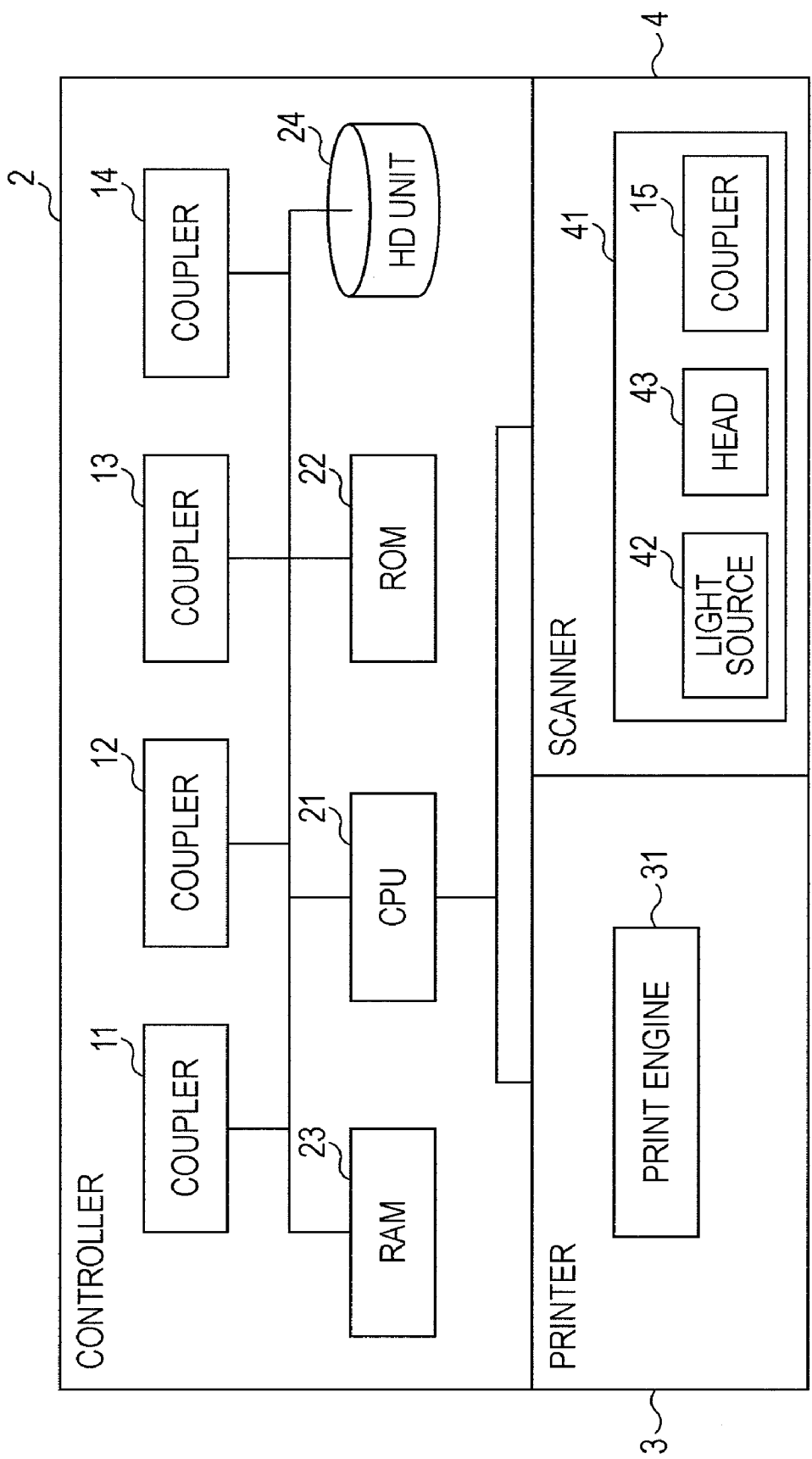
FIG. 2 is a view illustrating a configuration of the multifunctional apparatus according to the embodiment.
Figure 3A:
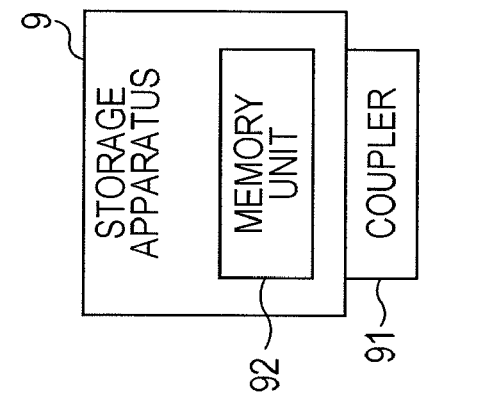
FIGS. 3A to 3D are examples of terminal apparatuses according to the embodiment.
Figure 3B:
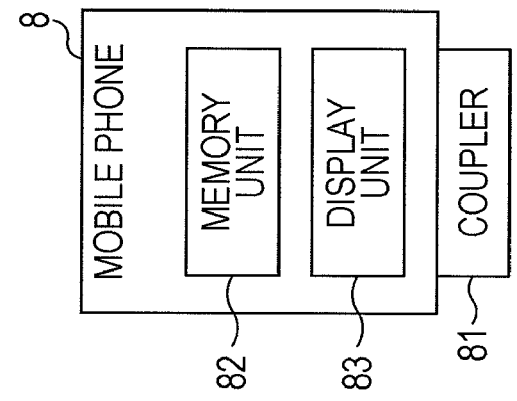
Figure 3C:
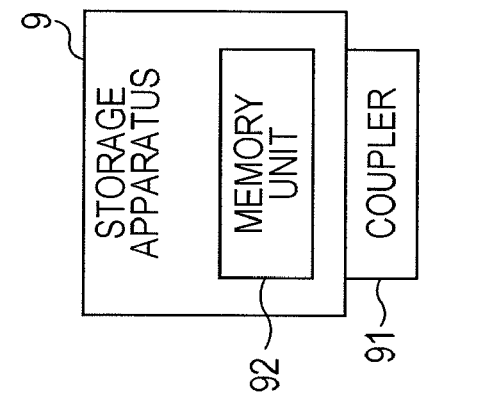
Figure 3D:
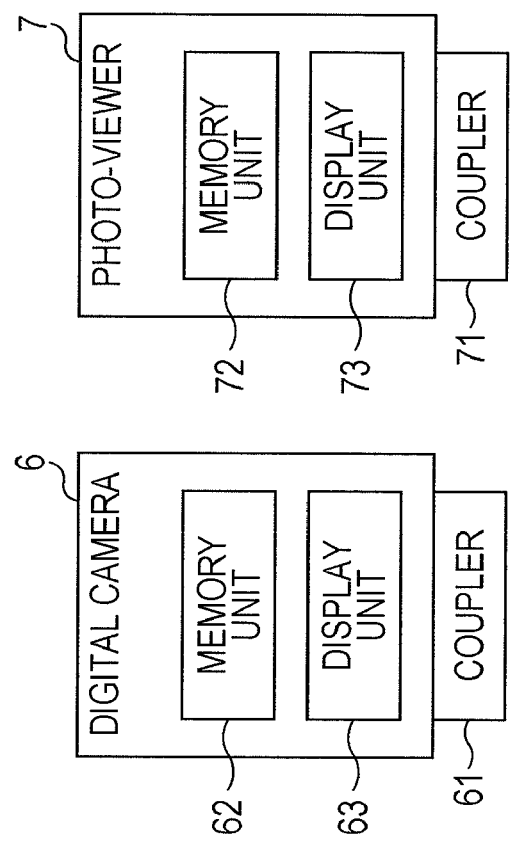

FIG. 2 is a view illustrating a configuration of the multifunctional apparatus 1.

As shown in the figure, the multifunctional apparatus 1 includes a controller 2, a printer 3, and a scanner 4. The controller 2 includes a CPU 21, a ROM 22, a RAM 23, an HD (hard disc) unit 24 as a large-capacity storage unit, and couplers 11 to 14. The couplers 11 to 14 are disposed at the positions shown in FIG. 1 so that the couplers are exposed from the case 10.

The CPU 21 executes a predetermined program, which is stored in the ROM 22 or the HD unit 24, by using the RAM 23, so that the below-described functions of the multifunctional apparatus 1 can be implemented.

The printer 3 includes a print engine 31 for performing printing, a sheet transport mechanism (not shown), and the like.

The scanner 4 includes a carriage 41 in which a light source 42 and a reading head 43 are provided. Since the coupler 15 is provided in the carriage 41, the coupler 15 and the carriage 41 are integrally moved.

FIGS. 3A to 3D illustrate examples of terminal apparatuses that are counter communication parties of the couplers 11 to 15. In the embodiment, the terminal apparatuses 6 to 9 which are counter communication parties of the couplers 11 to 15 are, for example, portable information processing apparatuses. The terminal apparatuses 6 to 9 may be a digital camera 6, a photo-viewer 7, a mobile phone 8, and a storage apparatus 9. Each of the digital camera 6, the photo-viewer 7, the mobile phone 8, and the storage apparatus 9 includes a memory unit 62, 72, 82, or 92 such as a hard disc unit or a flash memory and a coupler 61, 71, 81, or 91 for communicating with any one of the couplers 11 to 15 of the multifunctional apparatus 1. Each of the digital camera 6, the photo-viewer 7, and the mobile phone 8 further includes a display unit 63, 73, or 83 such as a liquid crystal display. In the description hereinafter, when common functions or configurations of the digital camera 6, the photo-viewer 7, the mobile phone 8, and the storage apparatus 9 are to be described, these apparatuses are expressed by the terminal apparatuses 6 to 9; and when unique functions or configurations of individual terminal apparatus are to be described, these apparatuses are expressed by detailed names thereof.

Referring to FIG. 2 again, in the embodiment, if one of the couplers 11 to 15 of the multifunctional apparatus 1 detects the terminal apparatuses 6 to 9 as counter communication parties, the detecting coupler of the couplers 11 to 15 cooperates with the detected terminal apparatuses 6 to 9 to perform a process associated in advance with the detecting coupler of the couplers 11 to 15, which detects the terminal apparatuses 6 to 9. For example, specific functions may be allocated to the couplers 11 to 15. If one of the couplers 11 to 15 detects one of the couplers 61 to 91 provided to the terminal apparatuses 6 to 9, one of the terminal apparatuses 6 to 9, which includes the detected one of the couplers 61 to 91, and the multifunctional apparatus 1 communicate with each other through the detecting coupler of the couplers 11 to 15 and the detected coupler of the couplers 61 to 91, so that the functions allocated to the one of the couplers 11 to 15 of the multifunctional apparatus 1, which detects one of the terminal apparatuses 6 to 9, can be implemented.

Therefore, even though a user does not perform complicated manipulation for performing a desired function, the desired function can be implemented by merely locating the terminal apparatus in the vicinity of the coupler corresponding to the function. Hereinafter, detailed examples of the performed functions are described.

For example, the coupler 11 is configured to be associated with a function of reading data from the terminal apparatuses 6 to 9. In other words, if the coupler 11 (fourth antenna) detects the terminal apparatuses 6 to 9 (fourth terminal apparatus) as counter communication parties, the multifunctional apparatus 1 acquires image data stored in the terminal apparatuses 6 to 9 through the coupler 11 and stores the image data in the HD unit 24. Therefore, by merely locating the couplers 61 to 91 of the terminal apparatuses 6 to 9 in the vicinity of the coupler 11, it is possible to back up the data stored in the memory units 62 to 92 of the terminal apparatuses 6 to 9 to the multifunctional apparatus 1.

On the other hand, the coupler 12 is configured to be associated with a function of outputting data to the terminal apparatuses 6 to 9. In other words, if the coupler 12 detects the terminal apparatuses 6 to 9 as counter communication parties, the multifunctional apparatus 1 outputs the data stored in the HD unit 24 to the terminal apparatuses 6 to 9 through the coupler 12 so as to store the data in the memory units 62 to 92. The data that are output to the terminal apparatuses 6 to 9 may be, for example, data stored in a specific folder of the HD unit 24 or data of a specific date.

Therefore, by merely locating the couplers 61 to 91 of the terminal apparatuses 6 to 9 in the vicinity of the coupler 12, it is possible to back up the data stored in the multifunctional apparatus 1 to the terminal apparatuses 6 to 9.

The coupler 13 is configured to be associated with a function of outputting image data read from the scanner 4 to the terminal apparatuses 6 to 9. In other words, if the coupler 13 (first antenna) detects the terminal apparatuses 6 to 9 (first terminal apparatus) as counter communication parties, the multifunctional apparatus 1 transmits the image data read from the scanner 4 to the terminal apparatuses 6 to 9 through the coupler 13 so as to store the image data in the terminal apparatuses 6 to 9.

Therefore, when the scanner 4 performs scanning, by merely locating the couplers 61 to 91 of the terminal apparatuses 6 to 9 in the vicinity of the coupler 13, it is possible to store the scanned image data in the memory units 62 to 92 of the terminal apparatuses 6 to 9.

The coupler 14 is configured to be associated with a function of printing the image data stored in the terminal apparatuses 6 to 9. In other words, if the coupler 14 (third antenna) detects the terminal apparatuses 6 to 9 (third terminal apparatus) as counter communication parties, the multifunctional apparatus 1 acquires the image data stored in the memory units 62 to 92 of the terminal apparatuses 6 to 9 through the coupler 14 and stores the image data in the HD unit 24. Next, the printer 3 prints an image based on the read image data. Particularly, in the case where the terminal apparatus is the digital camera 6, the photo-viewer 7, or the mobile phone 8, the image data corresponding to the image displayed on the display units 63 to 83 may be read, and the printing may be performed by using the image data.

Therefore, by merely locating the couplers 61 to 81 of the terminal apparatuses 6 to 8 in the vicinity of the coupler 14, the image data stored in the multifunctional apparatus 1, particularly, the image displayed on the display units 63 to 83 can be acquired from the terminal apparatuses 6 to 8, and the image data can used for the printing. Accordingly, the user can also intuitively recognize this function.

Since the coupler 15 (second antenna) is provided in the carriage 41, the coupler 15 and the carriage 41 are integrally moved, every time when a plurality of the terminal apparatuses 6 to 9 mounted on the platen 20 are sequentially detected, the coupler 15 and the terminal apparatuses 6 to 9 cooperate with each other to perform a process associated in advance with the second antenna.

For example, similarly to the coupler 13, the coupler 15 may be configured to be associated with a function of printing the image data stored in the terminal apparatuses 6 to 9. In addition, for example, one or more terminal apparatuses 6 to 9 are mounted on the platen 20 in advance. In this case, each of the couplers 61 to 91 may be disposed to face down. Next, the coupler 15 is moved together with the carriage 41 to sequentially detect the couplers 61 to 91, so that the image data are read from the terminal apparatuses 6 to 9. The read image data are temporarily stored in the HD unit 24, and after that the image data are used for the printing of the printer 3. Particularly, in the case where the terminal apparatus is the digital camera 6, the photo-viewer 7, or the mobile phone 8, the image data displayed on the display units 63 to 83 are read, and the printing may be performed by using the image data.

Therefore, while data can be continuously read from a plurality of the terminal apparatuses, the printing can be performed.

According to the aforementioned multifunctional apparatus 1 according to the embodiment, it is possible to implement a simple and intuitive function by using short range wireless communication.

Hereinbefore, the invention is described by using exemplary embodiments, but the scope of the invention is not limited to the embodiments. It should be understood by those skilled in the art that various modifications may be made without departing from the spirit of the invention.

For example, although the aforementioned embodiment is described by using an example using Transfer Jet as the short range wireless communication, the invention may be adapted to a short range wireless communication such as infrared communication other than the Transfer Jet.

What is claimed is:

1. An information processing apparatus having a plurality of antennas for short range wireless communication, cooperating with a detected terminal apparatus when each of the antennas detects the terminal apparatus as a counter communication party, and performing a process associated in advance with the antenna that detects the terminal apparatus, comprising:
   a scanner,
   wherein if a first antenna among the antennas detects a first terminal apparatus, the image data read by the scanner is transmitted to the first terminal apparatus through the first antenna so as to be stored in the first terminal apparatus,
   wherein the scanner includes:
   a platen; and
   a carriage in which a scanner head is provided,
   wherein a second antenna among the antennas is provided to the carriage, and
   wherein, every time when the second antenna is moved together with the carriage to sequentially detect the terminal apparatuses mounted on the platen, the information processing apparatus and the terminal apparatuses cooperate with each other to perform a process associated in advance with the second antenna.

2. The information processing apparatus according to claim 1, further comprising a printer,
   wherein the information processing apparatus acquires image data corresponding to an image, displayed on an image display unit of each of the terminal apparatuses, from each of the terminal apparatuses through the second antenna and performs printing based on the acquired image data by using the printer.

3. The information processing apparatus according to claim 1, further comprising a printer,
   wherein if a third antenna among the antennas detects a third terminal apparatus, the information processing apparatus acquires image data corresponding to an image displayed on an image display unit of the third terminal apparatus through the third antenna and performs printing based on the acquired image data by using the printer.

4. The information processing apparatus according to claim 1, further comprising a memory unit,
   wherein if a fourth antenna among the antennas detects a fourth terminal apparatus, the information processing apparatus acquires image data stored in the fourth terminal apparatus through the fourth antenna and stores the image data in the memory unit.

5. The information processing apparatus according to claim 1, wherein the antennas for the short range wireless communication are a plurality of couplers for Transfer Jet.

* * * * *